United States Patent [19]

Ting et al.

[11] 4,455,390
[45] Jun. 19, 1984

[54] CATALYST AND METHOD FOR IMPREGNATING AT A PH LESS THAN ONE

[75] Inventors: Pauline B. Ting, Brea; Howard D. Simpson, Irvine, both of Calif.

[73] Assignee: Union Oil Company of California, Los Angeles, Calif.

[21] Appl. No.: 409,583

[22] Filed: Aug. 19, 1982

[51] Int. Cl.$^3$ .................. B01J 21/04; B01J 23/85
[52] U.S. Cl. ............................. 502/314; 502/204; 502/254; 502/255; 502/257
[58] Field of Search ............ 252/465; 502/204, 254, 502/255, 257, 314

[56] References Cited

U.S. PATENT DOCUMENTS 3,232,887  2/1966  Pessimisis ........................ 252/435
4,107,087  8/1978  Pessimisis ........................ 502/255

OTHER PUBLICATIONS

Fransen et al., "Preparation, Characterization, and Stability of Molybdenum Oxide Catalysts of the Monolayer Type", *Preparation of Catalysts*, Edited by Delmon, Jacobs, and Poncelet, 1976, Elsevier Scientific Publishing Company, pp. 405-420.

*Primary Examiner*—Delbert E. Gantz
*Assistant Examiner*—Lance Johnson
*Attorney, Agent, or Firm*—Alan H. Thompson; Gregory F. Wirzbicki; Dean Sandford

[57]    ABSTRACT

A hydrocarbon conversion catalyst containing a Group VIB metal on a porous refractory oxide is prepared by impregnating support particles with a solution containing Group VIB metal components and citric acid, followed by drying and calcining. The catalyst is useful for promoting a number of hydrocarbon conversion reactions, particularly those involving hydrogenative desulfurization, demetallization and denitrogenation.

44 Claims, No Drawings 4,455,390

CATALYST AND METHOD FOR IMPREGNATING AT A PH LESS THAN ONE

BACKGROUND OF THE INVENTION

1. Field of the Invention

This invention relates to hydrocarbon conversion catalysts, such as those utilized to catalyze the reaction of hydrogen with organo-nitro, organo-metallic and particularly organo-sulfur compounds. More particularly this invention is directed to a catalyst useful for the hydrodesulfurization of hydrocarbons, such as gas oils and residuum, and to a method for preparing such catalysts by employing a novel aqueous impregnating solution. The invention is especially directed to catalysts of high overall desulfurization activity and stability.

2. Description of the Prior Art

In the refining of hydrocarbons, it is often necessary to convert a hydrocarbon fraction to different forms. Typically, particulate catalysts are utilized to promote desulfurization, denitrogenation or demetallization reactions when feedstocks such as gas oils or residuum are contacted with catalysts under conditions of elevated temperature and pressure and in the presence of hydrogen so that the sulfur components are converted to hydrogen sulfide, the nitrogen components to ammonia and the metals are deposited on the catalyst.

Conversions of hydrocarbons are often carried out with a catalyst containing Group VIB and Group VIII metals and phosphorous on a refractory oxide support. Compositions containing these and other elements have been previously investigated. For example, catalysts comprising a Group VIB metal, particularly molybdenum or tungsten, a Group VIII metal, particularly cobalt or nickel, and phosphorous on an alumina base have been disclosed in U.S. Pat. Nos. 3,755,196 and 3,840,472. Such catalysts are very often prepared by impregnation, that is, the deposition of the active components on the support base by contact thereof with an aqueous solution containing the active components in dissolved form. U.S. Pat. No. 3,755,196, for example, describes impregnating media and methods for preparing catalysts using stabilized impregnating solutions consisting of molybdenum plus nickel or cobalt salts with phosphoric acid dissolved in an aqueous medium. U.S. Pat. No. 3,840,472 discloses another process for preparing a stable impregnating solution that includes dissolving a nickel or cobalt compound with an acid of phosphorous followed by subsequent dissolution of molybdenum oxide. The presence of phosphorus in many conventional catalysts is apparently due to the method of catalyst preparation rather than just for catalytic activity and stability.

Although conventional catalysts, including those requiring phosphorous in their preparation, are active and stable for hydrocarbon conversion reactions, catalysts of yet higher activities and stabilities are still being sought, irrespective of phosphorous requirements. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, nitrogen, and/or contaminant metals content, become more mild. Milder conditions require less energy to achieve the desired product, and catalyst life is extended due to such factors as lower coke formation or the deposition of less metals.

It is generally accepted that greater active component uniformity in the catalytic particles improves activity. The formation of a more evenly distributed layer of the active components, such as the metals and their oxides, or sulfides, in sufficient concentration throughout the surface area of the catalytic support provides more efficient utilization of the catalytic contacting surface.

Accordingly, it is an object of this invention to provide hydrocarbon conversion catalysts having a relatively evenly distributed layer of active components and to provide a method for using such catalysts for the desulfurization, denitrogenation, and/or demetallization of hydrocarbons. Another object is to provide hydrocarbon conversion catalysts of improved desulfurization activity and stability in comparison to conventional catalysts. Yet another object is to provide a catalyst of improved demetallization and denitrogenation activity.

It is a further object of the invention to provide a method for preparing a hydrocarbon conversion catalyst. It is a further object still to provide a method for preparing hydrocarbon conversion catalysts of improved desulfurization activity and stability in comparison to conventional catalysts. Another object is to provide a method for preparing a catalyst of improved demetallization and/or denitrogenation activity. Yet another object is to provide an impregnating solution having long term stability that may be utilized for preparing hydrocarbon conversion catalysts. These and other objects and advantages of the invention will be apparent from the following description.

SUMMARY OF THE INVENTION

Briefly, the invention provides for a hydrocarbon conversion catalyst and for a method for preparing such a catalyst employing a novel impregnating solution. In one embodiment, the an aqueous impregnating solution is prepared having a pH less than about 1.2 and containing dissolved Group VIB metal and citric acid. A catalyst composition comprising a Group VIB metal component on a refractory oxide is prepared by impregnating support particles with this solution, followed by calcination. In another embodiment, a hydrocarbon conversion catalyst is prepared by the method of impregnating alumina-containing support particles with a stable aqueous impregnating solution having a pH less than about 1 and comprising dissolved ammonium heptamolybdate, nickel or cobalt nitrate and citric acid, followed by calcination. In this embodiment the solution contains molybdenum components in a total concentration greater than about 10 weight percent and citric acid components in a mole ratio to the molybdenum components of greater than 1 to 1.

Catalysts prepared in accordance with the invention are useful for promoting the conversion of hydrocarbons, particularly by hydrodesulfurization. A catalyst prepared with an impregnating solution exhibits high activity and improved stability when utilized to promote high conversions of organo-sulfur compounds, particularly those found in hydrocarbon gas oils, to hydrogen sulfide. Another catalyst prepared with an impregnating solution of the invention is especially suited for promoting the conversion of organometallic compounds found in hydrocarbon residuum fractions to deposable metals.

DETAILED DESCRIPTION OF THE INVENTION

Hydrocarbon conversion catalysts of the present invention are prepared with impregnating solutions containing citric acid and having relatively low pH values. The solutions contain dissolved citric acid and Group VIB metal components, with the preferred Group VIB metals being molybdenum and tungsten, with molybdenum being most preferred. The solutions may also contain Group VIII metal components, especially cobalt or nickel, usually in a total concentration from about 1 to about 10 weight percent, calculated as the monoxide. The mole ratio of the citric acid (as the monohydrate) to the Group VIB metal components (as the trioxide) in the solution is usually greater than about 1 to 1 and preferably at least about 1.5 to 1. Preferably, the solution contains one or more Group VIB metal components in a total concentration of at least 3 weight percent, calculated as the metal trioxides, and more preferably in the range from about 5 to about 50 weight percent.

The impregnating solution of the invention may be most conveniently prepared by dissolving into water a Group VIB metal compound and citric acid such that the resulting solution has a pH preferably less than about 1.2, more preferably less than about 1.0, and most preferably from about 0 to about 1.0. Generally, either the citric acid or Group VIB metal compound is first dissolved in the aqueous medium under conditions which will effect dissolution and provide the specified concentrations of components. At atmospheric pressure, any temperature in the range of about 35° F. to about 210° F. may be employed, but it is generally preferred to use a temperature of about 75° F. to about 150° F. It is preferred that the citric acid be added to the solution after dissolution of at least a portion of the Group VIB metal component, especially when an impregnating solution is desired that contains a relatively large proportion of Group VIB metal components, typically in a total concentration greater than about 10 weight percent. In addition to lowering the pH of an aqueous solution, the presence of citric acid in the impregnating solution reduces the length of time required to dissolve a given amount of Group VIB metal component and, more importantly, increases the total amount of Group VIB metal components which can be dissolved therein. For example, under the same temperature and pressure conditions effecting dissolution, an impregnating solution containing a maximum total concentration of about 10 weight percent of Group VIB metal components and no citric acid requires more time to dissolve and is less stable than a solution containing citric acid and having a maximum total concentration from about 10 to about 30 weight percent of Group VIB metal components.

Citric acid is conveniently used to increase the stability of the impregnating solution, typically when added in such an amount that the mole ratio to the Group VIB metal component is greater than about 1 to 1. Stability of the impregnating solution is generally increased as the mole ratio is increased; however, extremely high mole ratios, such as those greater than about 10 to 1 may have economic limitations and are usually avoided. A stable impregnating solution of the invention is essentially free of precipitating components and the dissolved components remain in solution for a time period sufficient to impregnate catalyst support particles without the formation of crystalline deposits. Furthermore, the stable impregnating solutions of the invention may be stored for a long term, such as a day to a week or more, prior to effective impregnation of support particles.

Citric acid may be added to the solution in liquid or solid form. A preferred compound is citric acid monohydrate, although any suitable form of citric acid or its precursor may be utilized.

A variety of Group VIB metal components may be utilized to produce a stable impregnating solution of the invention. In general, all Group VIB metal compounds soluble in aqueous media, particularly those of molybdenum or tungsten, may be utilized. The oxides of molybdenum (e.g., molybdenum trioxide) are useful, as are many salts containing molybdenum. Particularly useful are salts containing both a Group VIB metal and ammonium ion, such as ammonium dimolybdate, and most preferably ammonium heptamolybdate. Impregnating solutions containing ammonium are highly preferred, especially when the ammonium ion is present in a concentration exceeding 1.5 moles per liter, and preferably exceeding 1.9 moles per liter.

After dissolution of the Group VIB metal and citric acid, a Group VIII metal component may then be added to the impregnating solution. Suitable Group VIII metal compounds are water-soluble, and usually include an oxide, carbonate, and preferably a nitrate of cobalt, nickel, and chromium, or combinations thereof. The nitrate of cobalt and nickel are preferred, with cobalt nitrate most preferred. Preferably, the final solution contains Group VIII components (as the monoxide) in a total concentration between about 1 and 10 weight percent and more preferably less than 6 weight percent.

After addition of a Group VIII compound, the pH of the solution may drop below about 1.0, but if the solution remains above about 1.2, more acid is added to lower the pH preferably below about 1.2, and more preferably below about 1.0, and most preferably below about 0.8. The acid used to lower the pH may be any acid containing thermally decomposable anions or anions not resulting in undesirable compounds in the final catalyst. Citric acid is, of course, preferred, but others such as dilute nitric acid, dilute sulfuric acid, dilute hydrochloric acid, depending upon the final catalyst composition desired, may be suitable to lower the pH. An acid of phosphorus, such as orthophosphoric acid ($H_3PO_4$) or a phosphoric acid precursor, may conveniently be utilized when phosphorus is an additionally desired component of the final catalyst composition.

One unusual feature of the invention is that the impregnating solution is stable even when containing a relatively large proportion of Group VIB metal components, i.e., in a total concentration greater than about 10 weight percent. When the pH of the impregnating solution is below about 1.2, essentially no crystalline deposits or crystalline aggregations are detected in the impregnating solution that result in a lessening in hydrocarbon conversion activity in the final catalyst.

Several conventional methods may be employed to impregnate the catalytic support particles with the solution of this invention. One such method, commonly referred to as the spray impregnation technique, involves spraying the support with the impregnating solution. Another impregnating method, often used to maintain relatively low concentrations of active components in the solution, is the circulation or multi-dip procedure wherein the active support is repeatedly contacted with the impregnating solution with or without intermittent drying. However, in order to take advantage of the stability of the solution of the invention and especially when relatively high concentrations of Group VIB metals are desired, the pore volume or pore saturation technique is preferred. This method involves dipping the catalyst support into an impregnating solution having a volume usually sufficient to just fill the pores of the support and, on occasion, may be up to about 10 percent excess. The concentrations of active components in the solution during impregnation by this technique may be somewhat higher than those utilized in other methods because the ratios of active components in the final catalyst are determined directly by solution composition.

The impregnating solution of the invention may be utilized to incorporate metal components with any of a number of support particles. Support particles suitable for use herein include such refractory oxides as silica, magnesia, silica-magnesia, zirconia, silica-zirconia, etc. Other suitable supports include natural and synthetic crystalline and amorphous aluminosilicates and crystalline silicas, e.g., silicalite. Preferred refractory oxides comprise aluminum and are usually selected from the group consisting of alumina and silica-alumina. Gamma alumina is the most highly preferred support.

The foregoing refractory oxides are usually prepared in the form of shaped particulates by methods well-known in the art, with the preferred method being to extrude an inorganic refractory oxide gel, such as peptized alumina gel, through a die having openings therein of the desired size and shape, after which the extruded matter is cut into extrudates of desired length. Preferred refractory oxide particles are of cylindrical shape having a cross-sectional diameter of 1/32 to ⅛ inch and a length of 1/32 to ¾ inch. Also preferred are refractory oxide particles having lengths between 1/32 and ¾ inch and having cross-sectional shapes resembling that of a three-leaf clover, as shown, for example, in FIGS. 8 and 8A of U.S. Pat. No. 4,028,227. Other preferred particulates are those having quadralobal cross-sectional shapes.

Refractory oxide support particles prepared in the form of gel extrudates are generally pre-calcined prior to impregnation, especially if gamma alumina is the desired support material. Temperatures above about 900° F. are required to convert the alumina gel to gamma alumina. Usually, temperatures above about 1,100° F. are utilized to effect this transformation, with holding periods of one-half to three hours generally being utilized to produce preferred gamma alumina extrudates.

The amounts of active components retained on the support particles during impregnation will depend largely on physical characteristics of the support particles, inter alia, surface area, pore volume and pore size distribution. Broadly speaking, the support particles have a surface area of about 10 to about 400 m²/gram (as measured by the B.E.T. method), a pore volume from about 0.15 to about 1.5 cc/gram (as measured by standard mercury and helium differential density tests), and essentially any pore size distribution over a range of pore diameters as small as about 25 angstroms to as large as about 10,000 angstroms. Selection of a particular pore size distribution of the support particles depends in large part on the particular hydrocarbon conversion reaction that is to be promoted by the final catalyst. For example, if demetallization of a residuum oil is desired, the support particles are selected with a pore size distribution such that the final catalyst has at least about 5 percent of the pore volume in pores having a diameter greater than 100 angstroms and preferably an average pore diameter from about 125 to about 250 angstroms. On the other hand, a pore size distribution of support particles utilized to produce a final catalyst effective for desulfurization of gas oils should include pores sizes such that the final catalyst has at least about 50 percent of the pore volume in pores having a diameter from about 70 to about 130 angstroms.

In addition to such physical properties, the surfaces of the support particles utilized in a final catalyst also exhibit chemical characteristics that are, in part, related to a particular hydrocarbon conversion reaction to be promoted. One chemical characteristic of the surface of the support particle is the pH value of 50 milliliters of deionized water containing 10 grams of the support particles standing for 30 minutes at ordinary temperatures. Hereinafter, such a measurement technique shall be referred to as the "support pH test." Typically, support particles utilized in the preparation of catalysts of this invention yield a pH value, according to the support pH test, of about 5 to about 9, preferably about 5 to about 7.5 when hydrocarbon desulfurization or denitrogenation is a desired conversion reaction, and preferably about 6.5 to about 9 when demetallization is a preferred reaction. Furthermore, support particles yielding a pH value from about 6 to about 8, and more preferably 6.5 to about 7.5 usually are dual function, having suitable activities for both desulfurization and demetallization.

In one embodiment, the support particles are "pre-wetted" prior to impregnation. The support particles may be "pre-wet" by contact with water after pre-calcination such that at least 10 percent of the pore volume, and most preferably at least 30 percent, but not more than 50 percent of the pore volume, is filled with water. When the pores of the support particles are thus partially filled with water by this "pre-wet" method, the resulting catalyst, especially one containing less than about 10 weight percent of Group VIB metal components, will usually be found to have greater activity and stability for promoting hydrocarbon conversion reactions than if prepared without "pre-wetting."

Control of the contact time (aging) of the support particles with the impregnating solution improves homogeneity of the active components on the support. It is preferred to age the impregnated particles in the impregnation solution for at least about twenty minutes but usually less than about two hours before drying and calcining. However, the particles may be aged for up to eight hours or longer, especially when solutions contain a relatively high concentration of Group VIB metal components, typically, greater than 10 weight percent. Substantially even distribution of active components in the support results from aging the support particles under mild conditions, i.e., 50° F. to about 100° F., while utilizing the pore saturation method of impregnation.

After impregnation, the support is dried and calcined to produce a catalyst containing the active components in desired proportions. The impregnated support particles may be dried and calcined at a temperature of at least 750° F., and preferably about 800° F. to about 1,200° F., so as to convert the active metals to their oxide forms. However, impregnated support particles containing a significant portion of nickel are calcined at a temperature preferably less than about 1,000° F., although support particles containing significant cobalt amounts may preferably be calcined up to about 1,200° F. Furthermore, when calcining support particles impregnated with a solution of the invention containing a Group VIII metallic nitrate, flowing air is usually passed at a sufficient rate over the support particles to remove both the nitrogen oxide (NO and $NO_2$) and carbon dioxide ($CO_2$) produced by the exothermic reactions associated with nitrate and citric acid component decomposition.

Calcination of the impregnated support particles results in a substantial portion of the citric acid being removed. However, trace amounts of carbon may remain after calcination and generally the final composition contains less than 0.5, preferably less than 0.1, and most preferably 0 weight percent carbon, calculated as C.

The final composition of the catalyst of the invention contains a Group VIB metal component and, optionally, a Group VIII metal component on a refractory oxide. The final composition generally contains at least about 3 and preferably between about 5 and about 50 weight percent Group VIB metal components, calculated as the trioxides, and, if present, from about 0.5 to about 10 weight percent Group VIII metal components, calculated as the monoxide. It is more preferred when the catalyst is utilized to promote a desulfurization reaction during the processing of a hydrocarbon gas oil that the final composition contain greater than 10 weight percent, and most preferably between about 17 and about 30 weight percent of Group VIB metal components and preferably less than about 6 weight percent, and most preferably between about 1 and 4 weight percent Group VIII metal components. In another preferred embodiment in which the catalyst is utilized to promote demetallization reactions in a residuum feedstock, the final composition contains about 3 to about 17 weight percent of molybdenum components, calculated as $MoO_3$, and from 0 to about 3 weight percent of cobalt or nickel components, calculated as the monoxide. In still another preferred embodiment, the final composition contains about 17 to about 30 weight percent of molybdenum components, calculated as $MoO_3$, and about 1 to about 6 weight percent of cobalt or nickel components, calculated as the monoxide. The final composition of the catalyst may optionally contain at least one weight percent phosphorus, calculated as phosphorus.

Although many conventional catalysts and/or their preparations require some form of phosphorus, the presence of phosphorus in the impregnating solution or final catalyst of this invention is optional. As demonstrated in the examples hereafter, a catalyst prepared with the solution of the invention, without phosphorus, is more active and stable when utilized to promote desulfurization reactions in hydrocarbon oils than are catalysts containing phosphorus. However, phosphorus may be incorporated into the impregnating solution and final catalyst composition so as to improve the activity and/or stability of the catalyst of the invention for promoting a different hydrocarbon conversion reaction, such as denitrogenation.

Another unusual feature of the invention is that, after calcination of the impregnated support particles, no crystalline deposits or crystalline aggregations resulting in a lessening in activity or stability of the final catalyst are detected. As illustrated by examples hereinafter set forth, a catalyst prepared with the impregnating solution of the invention is highly stable and active for promoting hydrocarbon conversion reactions. Better dispersed forms of active components from the impregnating solution onto the support particles are believed responsible at least in part for the improved activity and stability of the catalysts of the invention as compared to conventional catalysts. Impregnation of support particles with the solution of the invention reduces the segregation of catalytic components into inactive crystalline species on the support.

The physical characteristics of the final catalyst composition will usually vary from those of the support particles by less than about 25 percent. A catalyst composition, preferably used in the processing of a hydrocarbon residuum fraction and containing about 3 to about 17 weight percent of Group VIB metal components and from 0 to about 3 weight percent of Group VIII metal components, has a surface area of about 25 to about 250 $m^2$/gram, a pore volume of about 0.4 to about 1.5 cc/gram, and a pore size distribution including at least 5 percent of the total pore volume in pores of diameter greater than 100 angstroms. In another preferred embodiment, a catalyst composition used in the processing of hydrocarbon gas oils and comprising about 17 to about 30 weight percent of Group VIB metal components and from about 1 to about 6 weight percent of Group VIII metal components, has a surface area of about 100 to about 400 $m^2$/gram, a pore volume of about 0.15 to about 1.2 cc/gram, and a pore size distribution including at least 50 percent of the total pore volume in pores of diameter between about 70 and about 130 angstroms.

After calcination, the oxided catalyst is generally presulfided so as to convert the active metal components to the corresponding sulfides. Usually the catalysts are presulfided prior to use by contact with a stream of sulfiding gas, such as hydrogen sulfide-hydrogen mixtures containing about 1 to 10 volume percent of hydrogen sulfide, at temperatures between about 200° and 1,200° F. Although presulfiding of the catalyst is preferred, it is not essential, as the catalyst may be sulfided in a short time by contact with a sulfur-containing feedstock processed under hydrocarbon conversion conditions.

The catalyst of this invention may be employed in any of several hydrocarbon conversion processes wherein catalytic composites containing Group VIB metals or Group VIB and Group VIII metals are known to be catalytically effective, such as hydrogenation, dehydrogenation, desulfurization, hydrodesulfurization, oxidation, denitrogenation, demetallization, isomerization, cracking, hydrocracking, reforming, and the like. The catalyst of the invention may be used to refine any of a great number of hydrocarbon oils, such as crude petroleum oils, crude synthetic oils such as shale oils, and fractions thereof. Preferably, however, the hydrocarbon oil will boil primarily above about 100°, and more preferably from about 100° F. to about 1,300° F., with the most preferred hydrocarbon oils being gas oils boiling in the range of about 600° to 1,100° F. and vacuum and atmospheric residua fractions boiling above about 1,000° F. Other hydrocarbon oils include lubricating oils, waxes, kerosene, solvent naphthas, fuel oils, diesel fuels, jet fuels, heavy naphthas, light naphthas, cycle oils from cracking operations, coker distillates, cracked gasoline, decant oils, and the like.

The catalyst of the invention is particularly effective for desulfurization, denitrogenation and demetallization reactions, especially when utilized to process hydrocarbon oils such as gas oils and residuum fractions. The gas oils typically contain sulfur in the form of organo sulfur compounds, for example, mercaptans, disulfides, and the like, and are usually present in a total concentration greater than 5 ppmw, but more often in excess of 100 ppmw, and often in a concentration greater than 0.1 weight percent, calculated as sulfur. The residuum fractions usually contain at least 1.0 weight percent of sulfur, and metallic contaminants, usually in the form of complex metal porphyrins containing nickel and vanadium, present in a total concentration of at least 30 ppmw, calculated as the metals. The feedstocks often contain undesirable proportions of nitrogen, usually in a concentration greater than 0.1 weight percent, and typically in the range between about 0.2 and 0.4 weight percent.

A hydrocarbon conversion catalyst of desired chemical and physical characteristics, as prepared in accordance with the invention, is usually employed as either a fixed or fluidized bed of particulates in a suitable reactor vessel wherein the hydrocarbon oil to be treated is introduced and subjected to elevated conditions of pressure and temperature, and a substantial hydrogen partial pressure, so as to effect the desired degree of conversion of, for example, sulfur, nitrogen and metal-containing compounds to hydrogen sulfide, ammonia, and metal forms capable of being deposited in the catalyst, respectively. Most usually, the catalyst is maintained as a fixed bed with the hydrocarbon oil passing downwardly therethrough, and the reactor is generally operated under conditions selected from those shown in the following Table 1:

TABLE 1

| Operating Conditions | Suitable Range | Preferred Range |
|---|---|---|
| Temperature, °F. | 500–900 | 600–850 |
| Hydrogen Pressure, p.s.i.g. | 100–3,000 | 500–2,500 |
| Space Velocity, LHSV | 0.05–5.0 | 0.1–3.0 |
| Hydrogen Recycle Rate, scf/bbl | 500–15,000 | 1,000–10,000 |

The invention is further illustrated by the following examples which are illustrative of specific modes of practicing the invention and are not intended as limiting the scope of the invention as defined in the appended claims.

EXAMPLE I

A catalyst prepared in accordance with the invention is tested under typical hydrodesulfurization conditions against two differently prepared reference catalysts consisting of particles of commercially available catalysts. The first commercial catalyst has a 1/20 inch trilobal cross-sectional shape and has a nominal composition of 15.0 weight percent of molybdenum components, calculated as $MoO_3$, 5.0 weight percent of cobalt components, calculated at CoO, 1.0 weight percent of phosphorous, calculated as P, and the balance of gamma alumina. The second commercial catalyst has a 1/20 inch trilobal cross-sectional shape, pore size distribution similar to the catalyst of the invention and a nominal composition of 20.0 weight percent of molybdenum components, calculated as $MoO_3$, 5.0 weight percent of cobalt components, calculated as CoO, 3.0 weight percent of phosphorus components, calculated at P, and the balance of gamma alumina. The catalyst of the invention compared against the commercial catalysts is prepared as follows:

Catalyst 1

An impregnating solution of the invention is prepared by placing ammonium heptamolybdate (36.2 grams) in a beaker containing 45 ml of water and partially dissolving by stirring for one minute. Undissolved ammonium heptamolybdate is dissolved by stirring into the resulting solution about 29 grams of citric acid (monohydrate). Cobalt nitrate ($Co(NO_3)_2 \cdot 6H_2O$) in the amount of 20.4 grams is then dissolved in the resulting solution. After dissolution of the cobalt nitrate, an impregnant solution having a volume of 95 ml and a pH of about 0.29 is obtained. This solution is stable and may be stored for two weeks or longer prior to impregnation.

Gamma alumina support particles (125 grams), having a pore size distribution as shown in Table II, are then contacted with the impregnant solution. Substantially all 95 ml of the impregnant solution is taken up by the support.

The impregnated composition is allowed to stand (age) for two hours following which it is oven dried at 110° C. and then calcined at 1,100° F. for ½ hour in flowing air. The final catalyst has a pore size distribution as shown in Table II and contains 18.0 weight percent of molybdenum components, calculated as $MoO_3$, and 3.3 weight percent of cobalt components, calculated as CoO.

TABLE II

PORE SIZE DISTRIBUTIONS AND SURFACE AREAS

| Pore Diameter, Angstroms | Support | | Catalyst 1 | |
|---|---|---|---|---|
| | Pore Volume, cc/gram | % of total p.v. | Pore Volume, cc/gram | % of total p.v. |
| 50–60 | 0.03 | 5 | 0 | 0 |
| 60–70 | 0.09 | 14 | 0.01 | 2 |
| 70–80 | 0.17 | 27 | 0.03 | 6 |
| 80–90 | 0.17 | 27 | 0.07 | 15 |
| 90–100 | 0.06 | 10 | 0.10 | 21 |
| 100–120 | 0.06 | 9 | 0.18 | 38 |
| 120–150 | 0.01 | 2 | 0.05 | 10 |
| 150–200 | 0.01 | 1 | 0.01 | 2 |
| 200–10,000 | 0.03 | 5 | 0.03 | 6 |
| TOTAL PORE VOLUME | 0.63 | | 0.48 | |
| SURFACE AREA $m^2$/gram | 250 | | 165 | |

The catalyst of the invention and the reference catalyst are then each presulfided by contact with Kuwait vacuum gas oil (VGO) "spiked" with dimethyl sulfide to a 2.9 weight percent sulfur content in the presence of hydrogen flowing at 2,000 standard cubic feet per barrel (scf/b). After heating the reactor containing the catalysts to 250° F., the spiked vacuum gas oil was introduced at a liquid hourly space velocity (LHSV) of 2.5. The temperature is gradually increased hourly by 50° F. until 600° F. is reached, except the temperature is held at 400° F. for ten hours and at 600° F. for two hours. The feedstock is then switched to Light Arabian VGO, the properties of which are shown in Table III, fed at a rate of 2.5 LHSV. The temperature is increased hourly by 20° F. to a temperature of 730° F.

TABLE III

| FEEDSTOCK PROPERTIES | |
|---|---|
| Feed Description | Light Arabian VGO |
| Gravity, °API | 20.8 |
| Sulfur, X-ray, Wt. % | 2.54 |
| Nitrogen, Wt. % | 0.090 |
| Pour Point, °F. | +95 |
| Carbon Residue on | |
| 10% Botts, D-189, Wt. % | 0.42 |
| ASTM D-1160 Distillation, °F. | |
| IBP/5 Vol. % | 623/700 |
| 10/20 | 737/776 |
| 30/40 | 810/837 |
| 50/60 | 860/898 |
| 70/80 | 928/968 |
| 90/95 | 1,019/1,056 |
| EP/Rec., Vol. % | 1103/99.0 |

Catalyst 1 is then tested to determine its activity and temperature increase requirement (TIR), i.e., stability for hydrodesulfurization in comparison to the reference commercial catalyst. The catalyst is charged to a reactor and utilized at 730° F. to hydrodesulfurize a Light Arabian VGO feedstock having the characteristics shown in Table III under the following conditions: 640 psig total pressure, 2.5 LHSV, and hydrogen rate of 1,500 SCF/B. The feedstock is contacted with the described catalysts in a single-stage, single-pass system with once-through hydrogen such that the effluent sulfur concentration is maintained at 0.15 weight percent sulfur, equivalent to about 94 percent desulfurization.

Giving the reference commercial catalyst an arbitrary activity of 100, relative activities of the catalyst of the invention compared to the reference commercial catalyst are determined by calculation and tabulated in Table IV. These determinations are based on a comparison of the reaction rates for desulfurization obtained from the data of the experiment according to the following standard equation which assumes one and one-half order kinetics for desulfurization:

$$\text{Relative Desulfurization Activity} = \frac{(1/S_p)^{\frac{1}{2}} - (1/S_f)^{\frac{1}{2}}}{(1/S_{pr})^{\frac{1}{2}} - (1/S_{fr})^{\frac{1}{2}}} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The temperature increase requirement (TIR) determinations are based upon calculation by a relatively simple formula. TIR may be determined by dividing the difference between two operating temperatures required to give a specific product on two given days in a run by run length interval between these days.

TABLE IV

| | Compsition | | | | Stability |
|---|---|---|---|---|---|
| | MoO3 Wt. % | CoO Wt. % | P Wt. % | Activity | TIR °F./day |
| First Com'l. Ref. | 15.0 | 5.0 | 1.0 | 100 | .58 |
| Second Com'l. Ref. | 20.0 | 5.0 | 3.0 | 103 | .33 |
| Catalyst 1 | 18.0 | 3.3 | 0 | 121 | .22 |

The data summarized in Table IV indicate that the temperature increase requirement (TIR) calculated in °F./day is substantially lower for the catalyst of the invention as compared to the reference catalysts. The deactivation rates of the first and second reference catalysts are respectively more than 2.5 and 1.5 times greater than is the case with the catalyst of the invention. In addition to this superiority in stability, the catalyst of the invention also exhibits substantially improved activity compared to the reference catalysts. Although containing a larger percentage of active components than the catalyst of the invention and still having a similar pore size distribution, the second commercial catalyst is not nearly as active or stable.

EXAMPLE II

Catalysts prepared in accordance with the invention are tested under typical hydrodemetallization conditions against a reference catalyst consisting of particles of a commercially available demetallization catalyst. The commercial catalyst has a 1/20 inch trilobal cross-sectional shape and has a nominal composition of 12.0 weight percent of molybdenum components, calculated as $MoO_3$, 4.0 weight percent of cobalt components, calculated at CoO, and the balance of gamma alumina. The catalysts compared against this commercial catalyst are prepared as follows:

Catalyst 2

An impregnating solution of the invention is prepared by placing ammonium heptamolybdate (8.5 grams) in a beaker containing 70 ml of water and partially dissolving by stirring for one minute. Undissolved ammonium heptamolybdate is dissolved by stirring into the resulting solution about 6.8 grams of citric acid (monohydrate). After dissolution of the ammonium heptamolybdate and citric acid, an impregnant solution having a volume of 89 ml and a pH of about 1.2 is obtained. This solution is stable and may be stored for two weeks or longer prior to impregnation.

Gamma alumina support particles (96 grams), having a pore size distribution as shown in Table V and yielding a pH value of 8.2 in deionized water, according to the support pH test, are then contacted with the impregnant solution. Substantially all 89 ml of the impregnant solution is taken up by the support.

Catalyst 3 and 4

Another impregnating solution of the invention is prepared by placing ammonium heptamolybdate (17 grams) in a beaker containing 140 ml of water and partially dissolving by stirring into the resulting solution about 13.6 grams of citric acid (monohydrate). Seventeen and one-half (17.5) grams of cobalt nitrate (Co(NO3)2.6H2O) is then dissolved in the resulting solution. After dissolution of the cobalt nitrate, ammonium heptamolybdate and citric acid, an impregnant solution having a volume of 178 ml and a pH of about 1.0 is obtained. This solution is stable and may be stored for two weeks or longer prior to impregnation. The 178 ml of impregnant solution is divided into 89 ml portions and utilized to prepare Catalysts 3 and 4.

In the preparation of Catalyst 3, gamma alumina support particles (96 grams), having a pore size distribution as shown in Table V and yielding a pH value of 8.2 in deionized water, according to the support pH test, are then contacted with the impregnant solution. Substantially all 89 ml of the impregnant solution is taken up by the support.

In the preparation of Catalyst 4, gamma alumina support particles (96 grams), having a pore size distribution as shown in Table V and yielding a pH value of 6.1 in deionized water, according to the support pH test, are then contacted with the impregnant solution. Substantially all 89 ml of the impregnant solution is taken up by the support.

The impregnated compositions of Catalysts 2, 3 and 4 are allowed to stand (age) for two hours following which they are oven dried at 110° C. and then calcined at 1,100° F. for ½ hour in flowing air. The final Catalyst 1 has a pore size distribution as shown in Table V and contains about 6.0 weight percent of molybdenum components, calculated as MoO3, and the balance of gamma alumina. The final Catalysts 3 and 4 have a pore size distribution as shown in Table V and contain about 6.0 weight percent of molybdenum components, calculated as MoO3, 2.0 weight percent of cobalt components, calculated as CoO, and the balance of gamma alumina.

TABLE V

PORE SIZE DISTRIBUTIONS AND SURFACE AREAS

| Pore Diameter, Angstroms | Support Pore Volume, cc/gram | % of total p.v. | Catalysts 2, 3 and 4 Pore Volume, cc/gram | % of total p.v. |
|---|---|---|---|---|
| 40–100 | 0 | 0 | 0 | 0 |
| 100–150 | 0.25 | .28 | 0.05 | 7 |
| 150–200 | 0.35 | 39 | 0.30 | 40 |
| 200–250 | 0.17 | 19 | 0.32 | 43 |
| 250–300 | 0.01 | 1 | 0.02 | 3 |
| 300–500 | 0.03 | 3 | 0.02 | 3 |
| 500–10,000 | 0.09 | 10 | 0.03 | 4 |
| TOTAL PORE VOLUME | 0.90 | 100 | 0.74 | 100 |
| SURFACE AREA m²/gram | 150 | | 130 | |

The catalysts of the invention and the reference catalyst are then each presulfided for about 16 to about 20 hours by contact with a gas consisting of 90 volume percent H2 and 10 volume percent H2S flowing at 4.4 SCFH at one atmosphere pressure. The temperature during the presulfiding is initially at room temperature, is increased gradually until 700° F. is reached, and then lowered to 550° F., at which time the catalyst is contacted with the feedstock.

The Catalysts 2, 3 and 4 and the reference catalyst are then tested to determine their hydrodemetallization activities and temperature increase requirements (TIR), i.e., stability (or resistance to deactivation). The presulfided Catalysts 2, 3 and 4 and the reference catalyst are each charged in separate runs to a reactor and utilized at 740° F. for 8 days and then raised to 760° F. to hydrodemetallize a Heavy Arabian atmospheric residua feedstock having the characteristics shown in Table VI below under the following conditions: 2,000 p.s.i.g. total pressure, 1.0 LHSV, and a hydrogen rate of 6,000 SCF/B.

TABLE VI

FEEDSTOCK PROPERTIES

| Feed Description | Heavy Arabian Atomospheric Residua |
|---|---|
| Gravity, °API | 13.0 |
| Sulfur, wt. % | 4.28 |
| Nitrogen, wt. % | 0.259 |
| Vanadium, ppm | 97 |
| Nickel, ppm | 28 |
| Ash, ppm | 189 |

TABLE VI-continued

FEEDSTOCK PROPERTIES

| Feed Description | Heavy Arabian Atomospheric Residua |
|---|---|
| Carbon Residue, D-189, wt. % | 11.9 |
| Asphaltenes, (UTM-86), wt. % | 14.6 |
| Pour Point, °F. | +12° C. (54° F.) |
| ASTM D-1160 Distillation Volumetric Cut | °F. |
| IBP | 507 |
| 5 | 644 |
| 10 | 701 |
| 20 | 789 |
| 30 | 861 |
| 40 | 930 |
| 50 | 1,012 |
| 60 | 0 |
| Max | 1,026 |
| Rec | 53.0 |

A portion of the feedstock is passed downwardly through each reactor and contacted with the described catalysts in a single-stage, single-pass system with once-through hydrogen such that the effluent metals concentration is maintained at 15 ppm, equivalent to about 90 percent demetallization, for 37 days. Giving the reference commercial catalyst an arbitrary activity of 100, relative activities of the catalysts of the invention compared to the reference commercial catalyst are determined by calculation and tabulated in Table VII. These determinations are based on a comparision of the reaction rates for demetallization obtained from the data of the experiment according to the following standard equation which assumes one and two-tenths order kinetics for demetallization:

$$\text{Relative Demetallization Activity} = \frac{(1/M_p)^{0.2} - (1/M_f)^{0.2}}{(1/M_{pr})^{0.2} - (1/M_{fr})^{0.2}} \times 100$$

where $M_{fr}$ and $M_{pr}$ are the respective concentrations of contaminant metals in the feed and product obtained with the reference catalyst and $M_f$ and $M_p$ are the respective concentrations of contaminant metals in the feed and product obtained with a catalyst being compared to the reference.

The temperature increase requirement (TIR) determinations are based upon calculations similar to Example I.

TABLE VII

| | Composition MoO3 Wt. % | CoO Wt. % | pH (support) | Activity | Stability TIR °F./day |
|---|---|---|---|---|---|
| Commercial reference | 12.0 | 4.0 | —* | 100 | 1.0 |
| Catalyst 2 | 6.0 | 0.0 | 8.2 | 147 | 1.0 |
| Catalyst 3 | 6.0 | 2.0 | 8.2 | 144 | 1.0 |
| Catalyst 4 | 6.0 | 2.0 | 6.1 | 120 | 1.0 |

*no support pH test (catalyst prepared by comulling)

The data summarized in Table VII indicate that Catalysts 2, 3 and 4 exhibit an improved demetallization activity compared to the commercial reference catalyst, despite containing far less active Group VIB metal components and, in one instance, initially no active Group VIII metal. In addition to this superiority in activity, the catalysts of the invention also exhibit equivalent TIR's compared to the commercial reference catalyst. Thus, catalysts of the invention may operate longer at milder conditions, (i.e., lower start of run temperatures) and have extended life compared to the commercial reference catalyst.

Catalyst 2, differing from Catalyst 4 by the absence of cobalt metal components and the support pH test, and Catalyst 3, differing from Catalyst 4 by the pH support test, are both more active for demetallizing the residuum oil fraction than Catalyst 4. Catalyst 4 of the invention is substantially more active than the commercial reference catalyst, but Catalysts 2 and 3, containing supports with a pH support test value of 8.2, are far more active for demetallizing a hydrocarbon than are either Catalyst 4 or the commercial reference catalyst.

EXAMPLE III

An impregnant solution is prepared in a similar manner as the solution utilized to prepare Catalyst 2 in Example II except no citric acid is added to the solution. The resulting solution has a pH of about 4.9 and is relatively unstable, not storable for more than a day prior to impregnation of support particles.

EXAMPLE IV

Impregnant solutions 1 through 6 are prepared, five with a citric acid solution, and each observed for pH and stability. Solutions 1 through 6 contain 10 ml portions of 0.28 molar ammonium heptamolybdate (AHM) solution and 2 molar chromium nitrate solution. Prior to addition of chromium nitrate solution to AHM in solutions 2 through 6, respective portions containing 2.5, 5, 6.6, 7.5 and 10 ml of 2 molar citric acid solution are added to clear a slightly cloudy AHM solution.

Data derived from observation of pH, color and precipitation for impregnant solutions 1 through 6 are summarized in Table VIII.

TABLE VIII

CATALYST IMPREGNANT SOLUTIONS

| Sol. No. | Mole Ratio Citric Acid/ AHM | 0.28M AHM Solution, ml + | 2M Citric Acid Solution, ml + | 2M Chromium Nitrate Solution, ml | After Two Weeks pH ±0.01 | Ppt. | Color |
|---|---|---|---|---|---|---|---|
| 1 | 0 | 10 | 0 | 10 | 0.41* | Yes** | Green |
| 2 | 0.5:1 | 10 | 2.5 | 10 | 0.42* | Yes** | Green |
| 3 | 1:1 | 10 | 5 | 10 | 0.43 | No | Blue-Green |
| 4 | 1.3:1 | 10 | 6.6 | 10 | 0.37 | No | Blue |
| 5 | 1.5:1 | 10 | 7.5 | 10 | 0.32 | No | Blue |
| 6 | 2:1 | 10 | 10 | 10 | 0.31 | No | Blue |

*pH of solution above the precipitate
**precipitate upon contact of chromium nitrate with AHM The data summarized in Table VIII indicate the effect upon solution stability as a function of the mole ratios of citric acid to molybdenum (in AHM) for impregnant solutions 1 through 6. Solutions 3 through 6, having a mole ratio of at least 1 to 1, are observed to be stable for at least 2 weeks.

While particular embodiments of the invention have been described, it will be understood, of course, that the invention is not limited thereto since many obvious modifications can be made, and it is intended to include within this invention any such modifications as will fall within the scope of the appended claims.

We claim:

1. A catalytic composition prepared by the method comprising the steps of (1) impregnating support particles with an aqueous impregnating solution comprising one or more dissolved Group VIB metal components and citric acid, and wherein said solution has a pH less than 1.0, and (2) calcining the impregnated support particles.

2. The composition defined in claim 1 comprising at least about 3 weight percent of Group VIB metal components.

3. The composition defined in claim 1 wherein said Group VIB metal components are selected from the group consisting of molybdenum and chromium.

4. The composition defined in claim 1 wherein said impregnating solution further comprises one or more Group VIII metal components.

5. The composition defined in claim 4 further comprising about 0.5 to about 10 weight percent of Group VIII metal components.

6. The composition defined in claim 4 wherein said Group VIII metal components are selected from the group consisting of water-soluble compounds of cobalt and nickel.

7. The composition defined in claim 4 wherein said Group VIII metal components are selected from the group consisting of the nitrate, oxide and carbonate of cobalt and nickel.

8. The composition defined in claim 1 wherein said impregnating solution further comprises ammonium ions.

9. The composition defined in claim 1 wherein said solution has a pH between about 0 and 1.0.

10. The composition defined in claim 1 wherein said impregnating solution further comprises said dissolved citric acid, calculated as the monohydrate, in a mole ratio to said dissolved Group VIB metal trioxide of greater than about 1 to 1.

11. The composition defined in claim 1 wherein said impregnating solution comprises a nitrate, oxide, or carbonate or chromium.

12. The composition defined in claim 1 or 4 wherein said impregnating solution contains said dissolved Group VIB metal components in a total concentration from about 5 to about 50 weight percent.

13. A hydrocarbon conversion catalyst prepared by the method comprising the steps of (1) impregnating alumina-containing support particles with a stable aqueous impregnating solution having a pH less than 1.0 and comprising dissolved ammonium heptamolybdate, nickel or cobalt nitrate and citric acid, wherein said solution contains molybdenum components, calculated as $MoO_3$, in a total dissolved concentration greater than about 10 weight percent, and wherein said solution further contains said dissolved citric acid in a mole ratio to said molybdenum components greater than 1 to 1, and (2) calcining said support particles obtained from step (1).

14. The catalyst defined in claim 13 wherein the calcined support particles obtained from step (2) comprise about 17 to about 30 weight percent of molybdenum components, calculated as $MoO_3$, and about 1 to about 6 weight percent of cobalt or nickel components, calculated as the monoxide.

15. The catalyst defined in claim 13 wherein said support particles yield a pH to deionized water of about 5 to about 9 prior to step (1).

16. The catalyst defined in claim 13 wherein said mole ratio of citric acid to molybdenum components is greater than about 1.5 to 1.

17. The catalyst defined in claim 13 wherein the calcined support particles obtained from step (2) have at least about 50 percent of the total pore volume in pores of diameter about 70 angstroms to about 130 angstroms.

18. A hydrocarbon conversion catalyst prepared by the method comprising the steps of (1) impregnating alumina-containing support particles with a stable aqueous impregnating solution having a pH less than 1.0 and comprising dissolved molybdenum components and citric acid, and (2) activating the impregnated support particles.

19. The catalyst defined in claim 18 wherein the activated support particles obtained from step (2) consist essentially of greater than about 3 weight percent of molybdenum components, calculated as $MoO_3$.

20. The catalyst defined in claim 18 wherein the activated support particles obtained from step (2) have at least about 5 percent of the total pore volume in pores of diameter greater than about 100 angstroms.

21. The catalyst defined in claim 18 wherein said impregnating solution further comprises Group VIII metal components selected from the group consisting of cobalt and nickel.

22. The catalyst defined in claim 21 wherein the activated support particles obtained in step (2) comprise less than about 6 weight percent of said Group VIII metal components.

23. The catalyst defined in claim 22 wherein the activated support particles obtained in step (2) comprise about 3 to about 17 weight percent of said molybdenum components, calculated as $MoO_3$, and about 0 to about 3 weight percent of nickel or cobalt components, calculated as the monoxide.

24. A method for preparing a catalyst composition comprising at least about 10 weight percent of Group VIB metal components, calculated as the trioxide, comprising the steps of (1) preparing an aqueous impregnating solution having a pH less than 1.0 by first dissolving one or more Group VIB metal components and then citric acid, (2) impregnating support particles with said impregnating solution, and (3) calcining said support particles obtained from step (2).

25. The method defined in claim 24 further comprising dissolving one or more Group VIII metal components into said impregnating solution after dissolution of said citric acid.

26. The method defined in claim 25 wherein said Group VIB metal components are selected from the group consisting of ammonium heptamolybdate and chromium nitrate and said Group VIII metal components are selected from the group consisting of cobalt nitrate and nickel nitrate.

27. The composition defined in claim 1 wherein said support particles yield a pH to deionized water or about 5 to about 9 prior to step (1).

28. The method defined in claim 24 wherein said impregnating solution contains said dissolved citric acid in a mole ratio to said dissolved Group VIB metal components, calculated as the trioxide, of greater than about 1 to 1.

29. A long-term stable impregnant solution for preparing a hydrogen conversion catalyst comprising an aqueous solution comprising one or more dissolved Group VIB metal components and citric acid, said citric acid, calculated as the monohydrate, in a mole ratio to said dissolved Group VIB metal, calculated as the trioxide, of greater than about 1 to 1, and wherein said solution has a pH less than about 1.0.

30. The solution defined in claim 29 further comprising phosphorus components.

31. The solution defined in claim 29 wherein said dissolved Group VIB metal components are selected from the group consisting of chromium and molybdenum.

32. The solution defined in claim 29 further comprising one or more dissolved Group VIII metal components.

33. The solution defined in claim 32 wherein said dissolved Group VIII metal components are selected from the group consisting of cobalt and nickel.

34. The composition defined in claim 1 wherein said support particles have a pore volume from about 0.15 to about 1.5 cc/gram.

35. The composition defined in claim 1 wherein the calcined support particles obtained from step (2) have at least about 50 percent of the total pore volume in pores of diameter about 70 angstroms to about 130 angstroms.

36. The composition defined in claim 1 wherein said support particles have a surface area from about 10 to about 400 $m^2$/gram.

37. The composition defined in claim 1 wherein said support particles yield a pH to deionized water of about 5 to about 9 prior to step (1).

38. The catalyst defined in claim 14 wherein the calcined support particles obtained from step (2) have at least about 50 percent of the total pore volume in pores of diameter about 70 angstroms to about 130 angstroms.

39. The catalyst defined in claim 13 wherein said solution contains nickel or cobalt nitrate in a total dissolved concentration from about 1 to about 10 weight percent, calculated as the monoxide.

40. The catalyst defined in claim 18 wherein said solution contains citric acid in a mole ratio to said molybdenum components greater than 1 to 1.

41. The catalyst defined in claim 18 wherein said alumina-containing support particles yield a pH to deionized water of about 5 to about 9 prior to step (1).

42. The catalyst defined in claim 21 wherein the activated support particles obtained from step (2) have at least about 50 percent of the total pore volume in pores of diameter about 70 angstroms to about 130 angstroms.

43. The catalyst defined in claim 21 wherein said alumina-containing support particles have a surface area from about 10 to about 400 $m^2$/ gram.

44. The catalyst defined in claim 22 wherein said alumina-containing support particles have a pore volume from about 0.15 to about 1.5 cc/gram.

* * * * *

UNITED STATES PATENT AND TRADEMARK OFFICE
CERTIFICATE OF CORRECTION

PATENT NO. : 4,455,390
DATED : June 19, 1984
INVENTOR(S) : Pauline B. Ting & Howard D. Simpson It is certified that error appears in the above-identified patent and that said Letters Patent are hereby corrected as shown below:

On page 1, [56] under References Cited, U.S. Patent Documents, Before 3,232,887 Pessimisis please add:

1,914,557 Craver 251/431
1,914,558 Craver 251/431
2,799,661 De Rosset 252/465
2,927,088 Michalko et al. 252/466

On page 1, [56] under References Cited, U.S. Patent Documents, After 3,232,887 Pessimisis please add:

3,816,344 Shimizu et al. 252/455R

In column 18, line 2 under Claim 27, the "or" should be --"of"--.

Signed and Sealed this

Fourth Day of December 1984

[SEAL]

*Attest:*

*Attesting Officer*

GERALD J. MOSSINGHOFF
*Commissioner of Patents and Trademarks*